United States Patent [19]

Ives

[11] Patent Number: 4,529,126
[45] Date of Patent: Jul. 16, 1985

[54] EXTERNAL MIXING SPRAY GUN

[76] Inventor: Frank Ives, 1862 Ives Ave., Kent, Wash. 98031

[21] Appl. No.: 475,051

[22] Filed: Mar. 14, 1983

[51] Int. Cl.³ .......................... B05B 15/00; B05B 7/08
[52] U.S. Cl. .................................... 239/112; 239/414; 239/417.5
[58] Field of Search ............ 239/412, 413, 414, 417.5, 239/418, 422, 433, 407, 104, 112, 408

[56] References Cited

U.S. PATENT DOCUMENTS

| | | | |
|---|---|---|---|
| 2,266,365 | 12/1941 | Harrison et al. | 239/412 |
| 2,780,496 | 2/1957 | Asbeck et al. | 239/422 X |
| 2,904,262 | 9/1959 | Peeps | 239/408 |
| 3,232,540 | 2/1966 | Cassanmagnago | 239/412 X |
| 3,318,530 | 5/1967 | Rhodes | 239/414 |
| 3,801,009 | 4/1974 | Marshall, III | 239/433 X |
| 3,927,833 | 12/1975 | Harrison et al. | 239/422 X |
| 3,986,672 | 10/1976 | Smith et al. | 239/433 X |
| 4,123,007 | 10/1978 | Gardner | 239/414 |
| 4,129,231 | 12/1978 | Larson | 239/414 X |
| 4,288,036 | 9/1981 | Jubinville | 239/414 X |

Primary Examiner—Jeffrey V. Nase
Attorney, Agent, or Firm—Christensen, O'Connor, Johnson & Kindness

[57] ABSTRACT

Spray gun (10) includes a unitary valve (22) for controlling the flow of polyester resin and catalyst through the gun and discharging the polyester resin and catalyst in converging streams from nozzles (24) and (26) so that the two liquids thoroughly mix as they flow together through the air. Valve (22) includes a rearward, catalyst mixing section (82) composed of an inlet sleeve (90) and an outlet sleeve (91), and a forward resin flow control section (84) composed of an elongate inlet sleeve (144) and an end sleeve (150). Inlet ports are formed in sleeves (90) and (144) and outlet ports are formed in sleeves (91) and (150) to permit the flow of catalyst and resin when an elongated needle (80), extending longitudinally through the center of the sleeves, is disposed in rearward, activated position and to prevent the flow of catalyst and resin when the needle (80) is disposed in forward, deactivated position.

18 Claims, 7 Drawing Figures

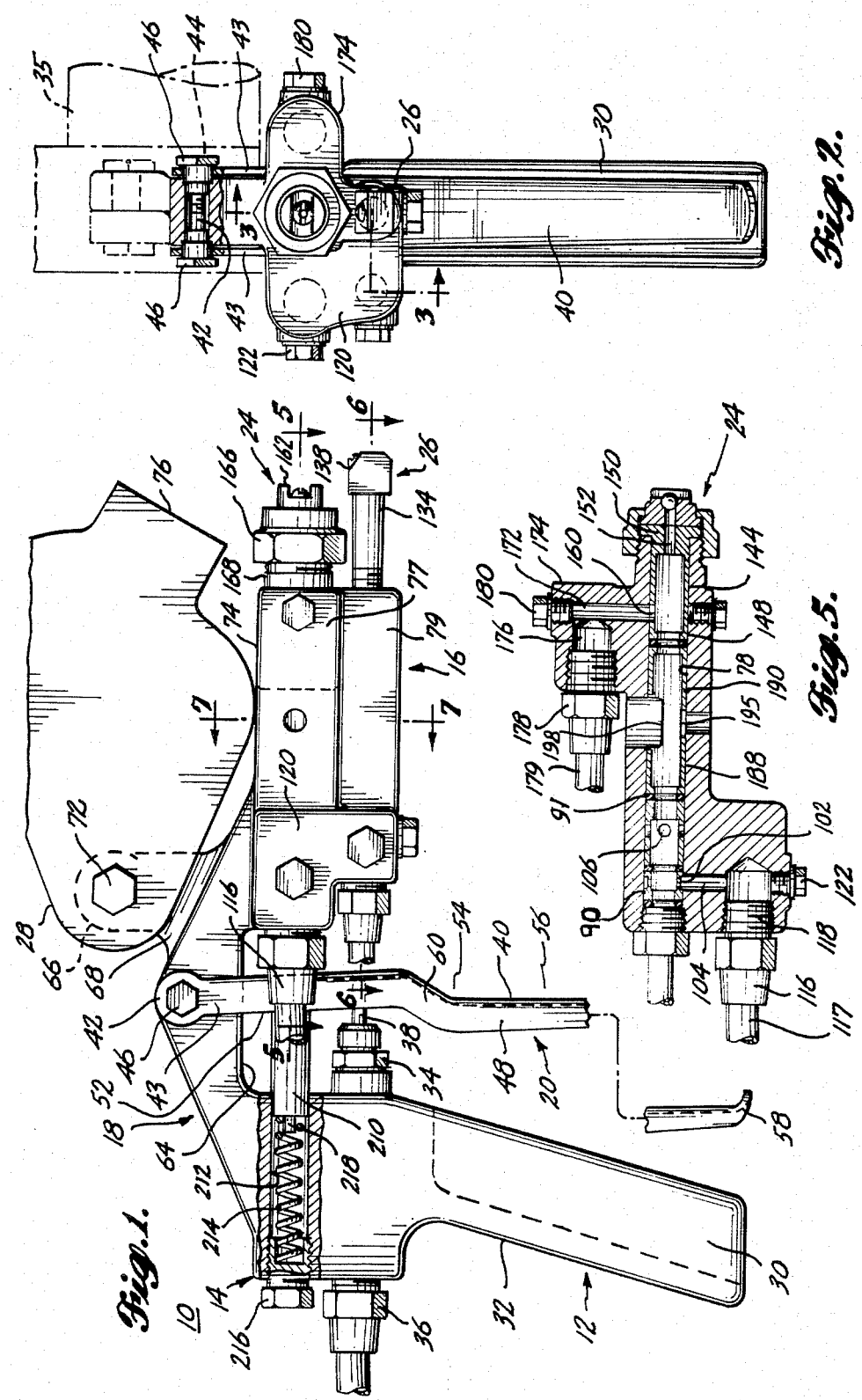

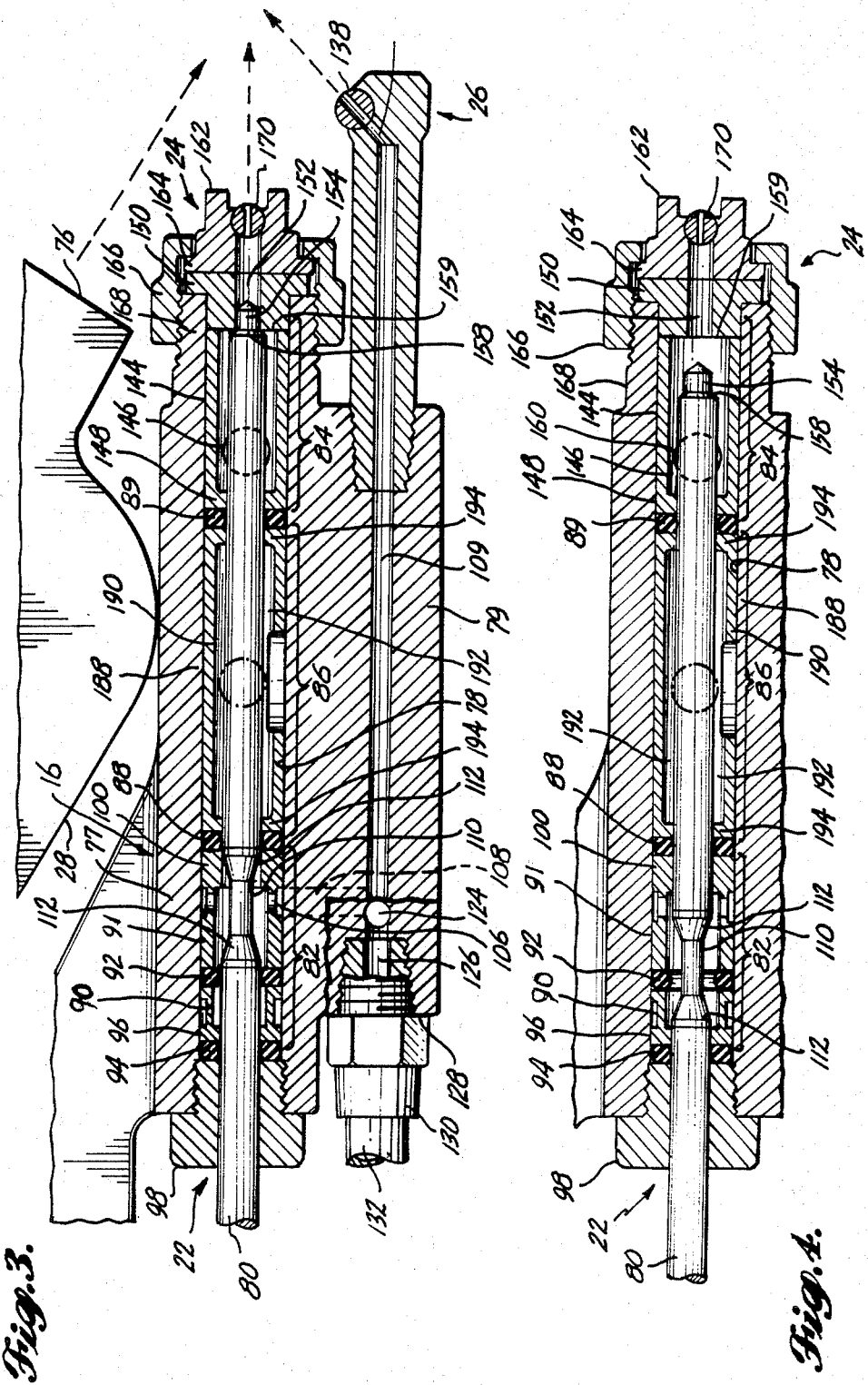

EXTERNAL MIXING SPRAY GUN

TECHNICAL FIELD

The present invention relates to polyester resin processing equipment, more particularly to a spray gun for ejecting a stream of polyester resin and a converging stream of polymerizing catalyst so that the resin and catalyst mix together externally of the gun, and to a single needle valve that simultaneously controls the flow of both the resin and catalyst so that they are discharged from the gun at the same time.

BACKGROUND OF THE INVENTION

Polyester resins reinforced with randomly oriented chopped glass fibers are commonly used to mold many products, such as automobile body components, bathtubs, machinery housings, and furniture. The use of chopped glass fiber substantially enhances the strength of the molded item. In a common production process, a hand-held gun is used to apply a mixture of polyester resin, glass fiber, and polymerizing catalyst in a mold, such as for a bathtub.

In one type of gun, the resin, and catalyst are mixed internally and then ejected from the front of the gun in a single stream. A chopper, powered by an air motor, chops strands of glass fiber into short pieces and then blows the chopped fibers into the resin/catalyst stream. A gun of this type has been marketed for several years by the assignee of the present application, Venus Products, Inc. of Kent, Wash. A drawback of this particular type of spray gun is that because the resin and catalyst are mixed internally within the gun, if the gun is not used, even for short periods of time, the resin will cure, thus plugging the gun. To prevent this from occurring, after each use of the gun, solvent, from a line connected to the gun, is pumped through the gun to purge the gun of the resin and catalyst. The solvent not only increases the operating cost of the gun and is harmful to certain components, such as seals, but also produces noxious and volatile fumes when sprayed from the gun. Thus, it is a principal object of the present invention to provide a spray gun for spraying two dissimilar liquids so that they are mixed together after being ejected from the gun.

Another drawback of spray guns designed to receive two dissimilar liquids, such as polyester resin and catalyst, and then eject a mixture of two liquids is that a separate valving mechanism is required for each liquid and an appropriate linkage mechanism is needed to simultaneously operate both valves so that both liquids flow at the same time. Accordingly, it is a further object of the present invention to provide a spray gun employing a single valve mechanism to simultaneously control the flow of two separate liquids thereby simplifying the gun design and reducing its weight and size.

A further related object of the present invention is to provide a spray gun with a singular valve for controlling the flow of two separate liquids with the valve integrally constructed within a gun and requiring only a minimum of machining of the gun.

SUMMARY OF THE INVENTION

The foregoing and other objects are achieved in accordance with the present invention by constructing a spray gun with a single needle valve housed within the barrel of the gun, with separate spaced-apart sections of the valve controlling the flow of catalyst and resin through the gun. Individual resin and catalyst nozzles discharge the catalyst and resin from the gun in converging streams so that the catalyst and resin thoroughly mix together as they flow through the air.

In one aspect of the present invention, an elongate, constant-diameter bore extends through the barrel of the gun. A series of sleeves is receivable within the bore to form the various sections of the valves. An elongate, unitary singular needle extends through the sleeve along the full length of the barrel to control the flow of catalyst and resin through the gun. The needle is nominally spring-loaded in a forward, deactivated position to prevent the flow of catalyst and resin through the gun, and is rearwardly slidable into activated position by the squeezing of the gun trigger to permit the flow of resin and catalyst through the gun for discharge through individual nozzles.

According to a further aspect of the present invention, the catalyst flow control section of the valve is located at the rearward position of the gun barrel and is composed of an inlet sleeve and a longitudinally adjacent outlet sleeve separated from each other by sealing means in the form of an O-ring. The catalyst inlet port is formed in the inlet sleeve to receive catalyst from an inlet passageway disposed in communication with a catalyst inlet line. Likewise, an outlet port is formed in the outlet sleeve in communication with an outlet passageway that interconnects with an elongated discharge passageway extending longitudinally through the barrel and terminating at the catalyst discharge nozzle at the forward end of the barrel. Pressurized air continually flows through the catalyst discharge passageway to dilute the catalyst and carry the catalyst through the passageway. A portion of the needle associated with the catalyst flow control section of the valve includes a reduced-diameter portion that is nominally aligned with the catalyst outlet sleeve when the needle is disposed in deactivated position so that the nominal diameter of the needle blocks the flow of catalyst from the inlet to the outlet port. However, when the needle is retracted to activated position, the reduced-diameter portion of the needle is aligned with the catalyst inlet port to permit the flow of catalyst from the inlet port to the outlet port.

According to a further aspect of the present invention, the valve includes a forward, resin flow control section at the forward end of the barrel. The resin flow control section is composed of an elongate inlet sleeve and a shorter outlet or end sleeve disposed in abutting relationship within the barrel bore. A resin inlet port is formed in the inlet sleeve for directing resin from an inlet passageway into this section of the valve. The outlet sleeve is formed with a reduced-diameter central bore coaxially aligned with the inside diameter of the inlet sleeve to serve as the outlet port for the resin. A reduced-diameter tip portion projects forwardly from the forward end of the needle to snugly engage within the central bore formed in the outlet sleeve to prevent the flow of resin through the central bore when the needle is disposed in forward, deactivated position. A frustoconically shaped face forms a transition between the forward end of the needle and the reduced-diameter tip portion and serves as a sealing face to positively seat against a square shoulder defined by the intersection of the central bore of the outlet sleeve and the adjacent end face of the outlet sleeve when the needle is disposed in forward, deactivated position. As the needle is retracted rearwardly into activated position, resin is still prevented from flowing into the outlet port formed by the central bore of the outlet sleeve until the tip portion of the needle has completely retracted from the outlet port. By this time, catalyst has begun flowing past the catalyst flow control section of the valve so that both the resin and catalyst are emitted through their respective nozzles at the same time.

According to a further aspect of the present invention, the valve includes an intermediate section disposed between the rearward catalyst flow control section and the forward resin flow control section. The intermediate section is composed of an elongate intermediate sleeve and sealing means for sealing the rear end of the sleeve from the catalyst flow control section and the forward end of the sleeve from the resin flow control section. The inside diameter of the intermediate sleeve is larger than the diameter of the needle to define a cavity surrounding the needle. An inlet port is formed on one side of the intermediate sleeve to direct cleaning solvent into the sleeve cavity to remove the catalyst and resin that may have leaked by the seal, and an outlet port is formed on the opposite side of the intermediate sleeve to direct the cleaning solvent out of the cavity.

BRIEF DESCRIPTION OF THE DRAWINGS

The details of a typical embodiment of the present invention will be described in connection with the accompanying drawings, in which:

FIG. 1 is a side elevational view of a spray gun constructed according to the present invention with portions shown in cross-section for clarity;

FIG. 2 is a front elevational view of the spray gun illustrated in FIG. 1;

FIG. 3 is an enlarged, fragmentary, cross-sectional view of the spray gun illustrated in FIG. 2 taken substantially along section lines 3—3 of FIG. 2 and specifically illustrating the position of the needle of the flow control valve disposed in forward, deactivated position;

FIG. 4 is an enlarged, fragmentary, cross-sectional view of a portion of FIG. 3 specifically illustrating the position of the needle of the flow control valve disposed in retracted, activated position;

FIG. 5 is a fragmentary, cross-sectional view of the spray gun illustrated in FIG. 1, taken substantially along section lines 5—5 thereof, with portions removed for clarity;

DETAILED DESCRIPTION OF THE INVENTION

Figure 6:
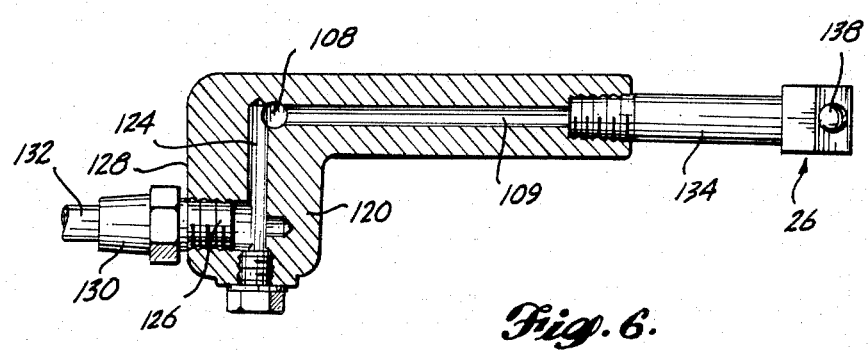
FIG. 6 is a fragmentary, cross-sectional view of a portion of the spray gun illustrated in FIG. 1, taken substantially along section lines 6—6 of FIG. 1.

FIG. 1 illustrates a typical spray gun 10 constructed according to the best mode of the present invention currently known to applicant. Although the gun may be employed for various uses, it will be described in conjunction for spraying glass fiber-reinforced polyester resin and catalyst. In basic form, gun 10 includes a body composed handle 12 extending downwardly from a butt 14 and a barrel 16 spaced forwardly of the butt by a generally triangularly shaped bridge 18. An elongate trigger 20 is pivotally mounted on bridge 18 to extend downwardly to approximately the bottom of handle 12. Referring additionally to FIGS. 2 through 4, trigger 20 actuates a needle valve 22 housed within barrel 16 to simultaneously control the flow of polyester resin and catalyst ejected from the gun through nozzles 24 and 26, respectively. As is known in the art, gun 10 also supports a chopper 28 that discharges chopped glass fibers in a stream to converge with the resin stream from nozzle 24. In this manner, the glass fibers, resin, and catalyst are mixed together externally of gun 10 as they are flowing in a common stream toward a mold, not shown, into which the glass fiber-reinforced resin is being applied.

Next, describing the above components of the present invention in greater detail, preferably the handle 12, butt 14, bridge 18, and barrel 16 of gun 10 are molded, cast, or otherwise formed as a single structural body for economy of construction and for structural integrity. To reduce the weight of gun 10, handle 12 is of hollow construction, having smooth, parallel sidewalls 30 that extend forwardly from the smooth, flat rear wall 32. It will be appreciated that by this construction handle 12 may be conveniently and comfortably grasped in the hand of the user.

The butt 14 of gun 10 is generally in the form of a solid, rectangular block of the same width as handle 12 and extends rearwardly of handle 12 to serve as a rest for the upper side of the user's hand. A longitudinal bore extends through the lower portion of the butt to receive a poppet-type air valve 34 that supplies air to power the motor 35 chopper. Air valve 34 is of common construction that is well known in the art and is disposed in normally off condition by an internal spring, not shown. Air from a supply source, not shown, enters valve 34 through a threaded rear fitting 36. The flow of air through the valve is controlled by actuation of a plunger 38 extending forwardly from the valve to bear against the front wall 40 of trigger 20. As the trigger is squeezed, plunger 38 is forced rearwardly in opposition to the internal spring, not shown, to cause air to flow through valve 34 and out of butt 14 through a side fitting 39 extending transversely outwardly from the right side of the butt, as viewed in FIG. 7, and then through a hose 41 leading to the chopper air motor 35. The use of air valve 34 to operate the chopper motor is well known in the art and does not in and of itself constitute a portion of the present invention.

A generally triangularly-shaped bridge 18 interconnects the top portion of butt 14 with the rearward top portion of barrel 16. Bridge 18 is illustrated as including parallel, smooth sidewalls that are spaced slightly inwardly from the corresponding sides of butt 14 and handle 12 to form the bridge in a width that is narrower than the width of the butt and the handle. A cross-hole extends transversely through the crown of bridge 18 for receiving pin 42 that pivotally mounts trigger 20 to the bridge. Pin 42 has a circular shank that extends through aligned, circular openings formed in parallel, spaced apart mounting ears 43 extending upwardly from the sidewalls 48 of trigger 20 and through the bridge crosshole to threadably engage with a corresponding nut 44. Pin 42 and a nut 44 are constructed with enlarged, hexagonally shaped heads 46 to retain trigger mounting ears 43 adjacent the sides of bridge 18.

As most clearly illustrated in FIG. 1, trigger 20 includes an elongated upper section 32, an intermediate diagonal section 54 extending downwardly and rearwardly from upper section 52 to intersect with an elongated lower section 56 offset rearwardly from and extending parallel to the upper sectioon 52 to terminate at a forwardly directed tip 58 that is at approximately the same elevation as the bottom of handle 12. The intermediate section 54, lower section 56, an tip 58 cooperate to comfortably receive the fingers of the user while restraining the fingers from vertically slipping from the trigger. In structural composition, the trigger includes parallel, rather narrow sidewalls 60 extending the full length of the trigger and interconnected by an arcuate forward wall 40 that extends from an elevation slightly below the undersurface 64 of bridge 18 to the bottom of the trigger. As noted above, trigger forward wall 40 pushes rearwardly against plunger 38 to actuate valve 34 when the trigger is squeezed.

A circular mounting boss 66 is formed in the upper portion of a lug 68 extending upwardly from the top surface of the forward half of bridge 18. A cross-hole extends centrally through lug 68 to receive a fastener 72 employed to secure chopper 28 to lug 68. The forward portion of chopper 28 rests on the upper surface 74 of barrel 16, thereby positioning the chopper in proper orientation so that its outlet spout 76 is disposed slightly above resin nozzle 24 to enable the glass fibers chopped by chopper 28 to converge with the resin stream at a location slightly forwardly of resin nozzle 24.

Referring to FIGS. 1 and 2, gun 10 includes an elongate barrel 16 spaced forwardly of butt 14 by bridge 18 and formed with an upper portion 77 and a lower portion 79. Additionally referring to FIGS. 3 and 4, barrel 16 houses a needle valve 22 that controls the flow of resin and catalyst to nozzles 24 and 26, respectively. Valve 22 is disposed within a constant diameter bore 78 extending longitudinally through the entire length of the upper portion 77 of barrel 16. Valve 22 includes a single, elongate, contoured needle 80 that snugly and slidably engages through a series of sleeves which divide the valve into a first or rearward catalyst flow control section 82, a second or forward resin flow control section 84 and a third or intermediate needle flushing section 86. These three valve sections are separated from each other by O-rings 88 and 89 that snugly engage over needle 80 and bear outwardly against bore wall 78.

The catalyst flow control section 82 of valve 22 includes an inlet sleeve 90 separated from an outlet sleeve 91 by an O-ring 92. A second O-ring 94 is interposed between the rear wall 96 of inlet sleeve 90 and the adjacent end of threaded plug 98 that engages with internal threads formed in bore 78. Plug 98, which restrains rearward movement of sleeves 90 and 91, is formed with a central throughbore for closely and slidably receiving the adjacent portion of needle 80. The rear end wall 96 of inlet sleeve 90 which snugly pilots within bore 78 is formed with a central opening that serves as a needle bore for closely and slidably receiving needle 80 to support and properly position the needle concentrically within bore 78; however, the remainder of the length of sleeve 90 is formed with an inside diameter that is somewhat larger than the diameter of needle 80. Outlet sleeve 91 is somewhat longer in length than inlet sleeve 90 and is formed with an outside diameter that snugly engages with bore 78. Sleeve 91 includes a forward end wall 100 having a concentric center opening functioning as a needle bore for slidably receiving needle 80, with the remainder of the length of the sleeve having an inside diameter somewhat larger than the outside diameter of the needle. Inlet sleeve 90 includes an inlet port 102, FIG. 5, in its sidewall that is in registry with a transverse, catalyst inlet passageway 104 formed in barrel 16 for directing the catalyst to valve section 82; likewise, outlet sleeve 91 includes a downwardly directed outlet port 106 in registry with an outlet passageway 108 extending downwardly through the barrel to a lower, horizontal discharge passageway 109 extending forwardly along lower portion 79 of the barrel, as described more fully below.

The section of needle 80 corresponding to valve flow control section 82 is formed with a reduced diameter portion 110 and frustoconical sections 112 at each end of the reduced diameter portion to transistion between the reduced diameter portion and the nominal diameter of the needle. The combined length of the two frustoconical sections 112 and the reduced diameter portion 110 preferably is substantially equal to the length of outlet sleeve 91 which in turn is approximately equal to the center-to-center distance along the length of bore 78 separating inlet and outlet ports 102 and 106. When needle 80 is disposed in deactivated position, as shown in FIG. 3, the reduced diameter portion and conical sections of the needle are positioned substantially in registry with outlet sleeve 91 so that O-ring 92 engages over the full diameter of the needle to prevent the catalyst from flowing from inlet port 102 to outlet port 106; however, when the needle is retracted into activated position, as shown in FIG. 4, frustoconical section 112 and a portion of the reduced diameter portion 110 of needle 80 are aligned with inlet sleeve 90 so that the catalyst is permitted to flow from inlet port 102 across O-ring 92 and out outlet port 106.

The catalyst is supplied to gun 10 through an inlet fitting 116 connected to a supply line 117. Fitting 116 threadably engages within a supply port 118 formed in the upper portion of a lug or projection 120 extending transversely outwardly from the rear portion of the left-hand side of barrel 16, as viewed in FIG. 2. As illustrated in FIG. 5, supply port 118 is disposed at the same elevation as valve bore 78 and transversely intersects with the adjacent end of catalyst inlet passageway 104. A threaded plug 122 engages with female threads formed in the center end portion of passageway 104, which may be formed by drilling or other convenient means.

As noted above, catalyst exits valve section 82 through outlet port 106 and then vertically downwardly through passageway 108, to intersect with the rear end of an elongate discharge passageway 109 just forwardly of the location that the discharge passageway intersects with the inward end of a transverse air inlet passageway 124, FIGS. 3 and 6. Discharge passageway 109 is disposed vertically below extends parallel to valve bore 78. The end of transverse passageway 124 opposite discharge passageway 109 is connected in airflow communication with a threaded air supply port 126 extending longitudinally forwardly from the lower, rear face 128 of the lower portion of lug 120. Air is continuously supplied to port 126 through a tapered fitting 130 connected to an air supply line 132. The air supplied through line 132 mixes with the catalyst within discharge passageway 109 to dilute and carry the catalyst through the discharge passageway, through an elongate discharge tube 134, that is engaged with a tapered, threaded counterbore formed in the adjacent end of barrel 16, and out through nozzle 26, which is constructed with a diagonal, upwardly directed interior passageway 136. An insert or tip 138, constructed from wear-resistant material, such as tungsten carbide, is mounted on the outlet side of nozzle 26. The size of tip 138 may be varied to control the flow rate of air and catalyst, while the shape may be varied to alter the spray pattern of the air/catalyst stream.

Next describing the flow of resin through gun 10, the resin flow control section 84 of valve 22 includes an elongate inlet sleeve 144 having an outside diameter snugly receivable within valve bore 78 and an inside diameter somewhat larger than the diameter of needle 80 to define an annularly shaped resin accumulation chamber 146 therebetween. Sleeve 144 includes a rear end wall 148 having a concentric opening formed therein to serve as a needle bore for closely and slidably receiving and supporting needle 80. The forward end of sleeve 144 abuts with an end sleeve 150 having a smaller diameter shank portion which snugly engages within valve bore 78 and a larger diameter flange portion which abuts the end of barrel 16. End sleeve 150 includes a concentric, central throughbore 152 formed in a diameter to closely and slidably receive a reduced diameter, forwardly projecting tip portion 154 of needle 80. Throughbore 152 serves as an outlet port for valve section 84. The leading end of tip 154 is shaped as a conical point to guide the tip into throughbore 152. A frustoconically-shaped poppet face 158 is formed between tip 154 and the adjacent portion of needle 80 to seat against a sharp, square shoulder 159 formed by the intersection of the inward end wall of end sleeve 150 and throughbore 152 when needle 80 is disposed in forward, deactivated position.

Resin enters chamber 146 through a horizontal side port 160 formed in the wall of sleeve 144 adjacent end wall 48. Resin is supplied to inlet port 160 through a transverse passageway 172, FIG. 5, extending inwardly through a forward, rectangularly-shaped lug 174 which projects outwardly from the forward portion of barrel 16 at the right side of the barrel, as viewed in FIG. 2. Passageway 172 transversely intersects with a larger diameter supply port 176 extending forwardly through lug 174 from the rear side of the lug and in a direction parallel to the length of barrel 78. Female threads are formed in supply port 176 for reception of a threaded fitting 178 for a resin supply line 179. A threaded plug 180 closes off the outer end of passageway 172 which is formed by drilling or other convenient means. It is to be understood that if passageway 172 is cast in place, the need for plug 180 will likely be eliminated.

When needle 80 is disposed in forward, deactivated position, poppet face 158 seats against shoulder 159 to provide a positive, drip-free seal therebetween so that resin supplied to chamber 146 through port 160 is not permitted to flow into bore 152 of end sleeve 150. Even as needle 80 is retracted into actuative position, resin still does not flow into bore 152 and out nozzle 24 until tip 154 disengages from bore 152. By this time, catalyst has begun flowing past valve section 82, through discharge passageway 109 and out nozzle 26. As a consequence, the resin from nozzle 24 and the catalyst from nozzle 26 begin flowing at substantially the same time to help ensure that all of the resin ejected by gun 10 is properly cured.

Nozzle 24 is preferably of standard design, composed of a tip 162, having a flanged portion 164 abutting against the adjacent face of end sleeve 150 and retained by a collar nut 166, which threadably engages with male threads formed on a circular extension portion 168 of barrel 16. Preferably, the resin is discharged from tip 162 through an insert 170 constructed from abrasion resistant material to reduce the rate of wear of the passageway formed within the insert so that the desired flow rate and spray pattern may be maintained for a significant length of time.

It will be appreciated that by locating catalyst flow control section 82 and resin flow control 84 at the opposite ends barrel 16, they are substantially isolated from each other, thereby minimizing the possibility that catalyst leaking by O-ring 88 or resin leaking past O-ring 89 will mix together and cause curing of the resin. Nevertheless, since it is unavoidable that some catalyst and resin will leak past O-rings 88 and 89, valve 22 is constructed with a needle cleaning section 86. Section 86 includes an elongate sleeve 188 composed of a cylindrical body portion 190 having an outside diameter snugly receivable within valve bore 78 and an inside diameter somewhat larger than the diameter of needle 80 to form a cleaning cavity 192. Preferably, sleeve 188 is long enough so that the portion of needle 80 disposed within valve section 82 when the needle is retracted into activated position does not overlap the portion of the needle that engages within valve section 84 when the needle is forwardly extended in deactivated position. Sleeve 118 also includes end walls 194 having aligned circular openings serving as needle bores for slidably receiving and guiding needle 80.

Figure 7:
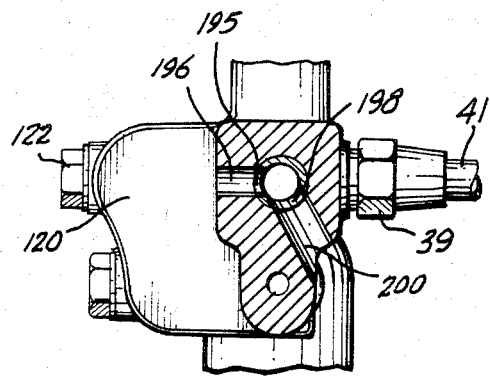
FIG. 7 is a fragmentary, cross-sectional view of the barrel illustrated in FIG. 1, taken substantially along section lines 7—7 thereof.

As most clearly shown in FIGS. 5 and 7, a horizontal, circular inlet port 195 is formed in the left hand side of body portion of 190 of sleeve 188 (FIG. 7), which port is in registry with a inlet opening 196 formed in barrel 16 for receiving cleaning solvents. The cleaning solvent is drained from cavity 192 out through a larger downwardly disposed outlet port 198 formed in the opposite side of sleeve 188 and through a corresponding outlet opening 200 formed in barrel 16. It will be appreciated that by the above described construction of cleaning section 86 of valve 22, the portion of needle 80 disposed within sleeve 188 may be conveniently cleaned by simply periodically flushing cavity 192 with an appropriate solvent; however, because catalyst and resin are not mixed together internally within gun 10, this cleaning procedure does not have to take place each time the gun is not used for a few minutes as required with spray guns in which the catalyst and resin are mixed within a gun.

As described above, needle 80 of valve 22 is slidable between the forward, deactivated position, shown in FIG. 3, to prevent the flow of catalyst through valve section 82 and resin through valve section 84, and a rearward activated position, shown in FIG. 4, to permit the flow of catalyst and resin through their respective valve sections and out nozzles 26 and 24. As with air valve 34, needle 22 is also operated by trigger 20. As most clearly illustrated in FIG. 1, the rear end portion of needle 80 spans across the gap separating the gun barrel 16 and the butt 14 through a slot (not shown) formed in trigger front wall 40 to engage through an elongate collar 210 which in turn closely and slidably engages within the longitudinal through bore 212 formed in the butt. Bore 212 is disposed in alignment with valve bore 78 and preferrably is of the same size as the valve bore thereby enabling the valve bore and butt bore to be machined at the same time by a single tool.

When trigger 20 is squeezed, the portions of forward wall 40 of the trigger on opposite sides of the trigger slot, not shown, pushes rearwardly against the front of collar 210 to slide needle 80 rearwardly into activated position. When the pressure on trigger 20 is relaxed, needle 80 is automatically slid forwardly into deactivated position by a compression spring to 214 seated within an elongated blind bore formed in the shank of an elongated plug 216 which engages with female threads formed in the adjacent portion of the bore 212. The forward end portion of spring to 214 is engaged over the rearward end portion 218 of needle 80 which extends rearwardly of collar 210. Needle rearward end portion 218 retains spring 214 to press against the back face of collar 210.

Preferably sleeves 90 and 91 of valve catalyst section 82 and sleeves 144 and 150 of valve resin section 84 are formed from a corrosion resistant, self lubricating material to minimize wear as needle 80 slides back and forth. Examples of such materials include teflon or high density polyethylene, high density plastic.

In the operation of gun 10, when trigger 20 is squeezed, needle 80 is retracted into activated position so that catalyst flows through valve section 82, mixes with air continuously flowing through discharge passageway 109 and is discharged in a diagonal, upwardly directed stream by nozzle 26. When needle 80 is retracted far enough so that needle tip 154 is disengaged from resin outlet bore 152, resin flows through valve section 84 and is discharged in a forwardly directed stream through nozzle 24. Preferably the length of tip 154 is such that resin is discharged from nozzle 24 at the same time that catalyst is discharged from nozzle 26 so that substantially all of the resin from gun 10 promptly mixes with catalyst. Simultaneously with the activation of valve 22, as trigger 20 is squeezed, air valve 34 is actuated to supply pressurized air to motor 35 of chopper 28 to initiate the discharge of chopped glass fibers from the chopper in a stream which converges with the resin and catalyst streams so that the fibers are thoroughly mixed with the resin and catalyst as they flow through the air.

As though apparent skilled in the art two which the invention is addressed, the present invention may be embodied in forms other than those specifically disclosed above not departing from the spirit or any essential characteristics of the invention. The particular embodiments spray gun 10 and needle valve 22, described above, are therefore to be considered in all respects as illustrative and not restrictive. The scope of the present invention is as set forth in the appended claims rather than being limited to the examples of air gun 10 and needle valve 22 set forth in the foregoing description.

The embodiments of the invention in which an exclusive property or privilege is claimed are defined as follows:

1. A spray gun for simultaneously controlling the flow of first and second fluids through said gun and mixing the fluids externally of said gun upon discharge therefrom, said gun, comprising:
(a) a body having:
  (i) an elongated uniform diameter first through bore formed therein, said through bore being smooth along substantially its entire length;
  (ii) a first set of spaced-apart inlet and outlet openings in fluid flow communication with said first body bore for receiving and discharging the first fluid;
  (iii) a second set of spaced-apart inlet and outlet openings in fluid flow communication with said first body bore for receiving and discharging the second fluid, said second set of inlet and outlet openings being spaced apart along the length of said first body bore from said first set of inlet and outlet openings;
  (iv) wherein said first through bore extending from said first set of openings to said second set of openings;
  (v) a first sleeve assembly associated with said first set of inlet and outlet openings, snugly, slidably receivable within said first body bore and defining a first valve chamber in association with said first inlet and outlet openings, said first sleeve assembly:
    (A) forming a first central needle bore;
    (B) including a first inlet port in communication with said first needle bore and in registry with said first inlet opening; and,
    (C) including a first outlet port in communication with said first needle bore and in registry with said first outlet opening;
  (vi) a second sleeve assembly associated with said second set of inlet and outlet openings, snugly and slidably receivable within said body bore at a location spaced apart from said first sleeve assembly, and defining a second valve chamber in association with said second inlet and outlet openings, said second sleeve assembly:
    (A) also forming a second central needle bore;
    (B) including second inlet port in communication with said second needle bore and in registry with said second inlet opening; and,
    (C) including a second outlet port in communication with said second needle bore and in registry with said second outlet opening, said second outlet port being formed in a diameter smaller than the diameter of said second needle bore to define a sharp seat at its intersection with said second needle bore;
  (vii) sealing means interposed between said first and second sleeve assemblies and slidably receivable within said first body bore to prevent the first and second fluids from mixing together; and,
  (viii) a second bore extending through an adjacent portion of said body from the location of said first bore, said second bore being in fluid receiving communication with the outlet opening of said first set and including an outlet opening defining a fluid discharge path for the first fluid that intersects with the fluid flow path of the second fluid flow at a location externally of said gun;
(b) an elongated solid needle having portions snugly receivable and slidable within said first and second central needle bores between a first, deactivated position and a second, activated position, said needle having:
a first section associated with the first inlet and outlet ports of said first sleeve assembly, said needle first section including a first needle bore blocking portion and a reduced-diameter portion;
a second section associated with the second inlet and outlet ports of said second sleeve assembly, said second section including a second needle bore blocking portion; and,
an intermediate section disposed between said first and second needle sections;
(c) means for slidably shifting said needle along said body bore between:
a first, deactivated position wherein said first bore blocking portion of said needle blocks fluid flow communication between said first inlet and outlet ports and said second bore blocking portion of said needle simultaneously blocks fluid flow communication between said second inlet and outlet ports; and, a second, actuated position wherein the reduced-diameter portion of said needle is disposed between said first inlet and outlet ports to permit fluid flow therebetween and said second bore blocking portion of said needle is positioned to permit fluid flow communication between said second inlet and outlet ports;

(d) wherein said second outlet port is formed in a diameter smaller than the diameter of the central needle bore to define a sharp seat at its intersection with the central needle bore; and, (e) said needle further comprising:

a frustoconical face portion abuttable against said shoulder seat to close off said second outlet port when said needle is disposed in deactivated position; and, a solid, reduced-diameter tip portion, said tip portion having a uniform diameter shank section extending forwardly from said frustoconical face portion and closely engageable within said second outlet port to continue to close off said second outlet port until said frustoconical face of said needle has been retracted a fixed distance away from said shoulder seat.

2. The spray gun according to claim 1:

further comprising an intermediate sleeve section disposed between said first and second sleeve assemblies; and, said sealing means sealing said first sleeve assembly from said intermediate sleeve section and sealing said second sleeve assembly from said intermediate sleeve section.

3. The spray gun according to claim 2, wherein said first sleeve assembly includes:

a first inlet sleeve having an inlet port in communication with said needle bore and in registry with said first inlet opening;

a first outlet sleeve having an outlet port in communication with said needle bore and in registry with said first outlet opening; and seal means disposed between said first inlet and outlet sleeves and snugly engaged over said needle when said needle is disposed in first, deactivated position to block transfer of the first fluid between said first inlet and outlet sleeves.

4. The spray gun according to claim 2, wherein said second sleeve assembly includes:

a second inlet sleeve having an inlet port in communication with said needle bore and in registry with said second inlet opening; and an end sleeve positioned in adjacent abutment with said second inlet sleeve, said end sleeve defining said second outlet port.

5. The spray gun according to claim 4, wherein said end sleeve includes a through bore disposed in longitudinal, coaxial alignment with said needle bore to define said second outlet port.

6. The spray gun according to claim 5, wherein said needle includes a tip portion of smaller uniform diameter engaged within said second outlet port defined by said end sleeve when said needle is disposed in deactivated position and disengaged from said second outlet port when said needle is disposed in activated position.

7. The spray gun according to claim 6, wherein one of said end sleeves and the second section of said needle defines a frustoconically-shaped face and the other of said end sleeve and the second section of said needle defining a shoulder in the form of a sharp edge for seating against the frustoconically-shaped face.

8. The spray gun according to claim 1, further comprising a carrier fluid supply port in communication with said first outlet opening and connectable to a carrier fluid supply source to draw the first fluid into said first inlet opening and said first inlet port, through said central needle bore, and out said first outlet opening and said first outlet port.

9. The spray gun according to claim 8, further comprising a first exterior nozzle in fluid receiving communication with said first outlet opening; and, a second exterior nozzle in fluid receiving communication with said second outlet opening and disposed to direct the second fluid in a discharge stream which converges with the stream of the first fluid discharged from said first nozzle.

10. A spray gun for simultaneously controlling the flow of first and second fluids through said gun and mixing the fluids externally of said gun upon discharge therefrom, said gun comprising:

(a) a body having:

an elongated first bore formed therein;

a first set of spaced-apart inlet and outlet openings in fluid flow communication with said body bore for receiving and discharging the first fluid;

a second set of spaced-apart inlet and outlet openings in fluid flow communication with said body bore for receiving and discharging the second fluid, said second set of inlet and outlet openings being spaced apart along the length of said body bore from said first set of inlet and outlet openings; and, a second bore extending through an adjacent portion of said body from the location of said first bore, said second bore being in fluid receiving communication with the outlet opening of said first set and including an outlet opening defining a fluid discharge path for the first fluid that intersects with the fluid flow path of the second fluid at a location externally of said gun;

(b) an elongated, solid needle having portions snugly receivable and slidable within said body bore between a first, deactivated position and a second, activated position, said needle having:

a first section associated with said body first inlet and outlet openings, said needle first section including a first bore blocking portion and a reduced-diameter portion;

a second section associated with said body second inlet and outlet openings, said second section including a second bore blocking portion; and, an intermediate section disposed between said first and second needle sections;

(c) means for slidably shifting said needle along said body bore between:

a first, deactivated position wherein said first bore blocking portion of said needle blocks fluid flow communication between said first inlet and outlet openings and said second bore blocking portion of said needle simultaneously blocks fluid flow communication between said second inlet and outlet openings of said body; and, a second, actuated position wherein the reduced-diameter portion of said needle is disposed between said first inlet and outlet openings to permit fluid flow therebetween and said second bore blocking portion of said needle is positioned to permit fluid flow communication between said second inlet and outlet openings of said body; and, (d) further comprising flushing means for flushing the intermediate section of said needle, said flushing means includes a third set of inlet and outlet openings formed in said body and disposed in fluid flow communication with said body bore at locations between said first and second sets of inlet and outlet openings to direct flushing medium to and from the intermediate section of said needle.

11. The spray gun according to claim 10, further comprising:
first sealing means engaged over the intermediate section of said needle, disposed within said body bore and interposed between said first set of inlet and outlet openings and said third set of inlet and outlet openings to block leakage of the first fluid therebetween; and
second sealing means engaged over said needle intermediate section, disposed within said body bore and interposed between said second set of inlet and outlet openings and said third set of inlet and outlet openings to block leakage of the second fluid therebetween.

12. The spray gun according to claim 10, wherein the diameter of said body bore in the region of said third set of inlet and outlet openings is larger than the diameter of the intermediate section of said needle to define a flushing medium receiving chamber.

13. A spray gun for simultaneously controlling the flow of first and second fluids through said gun and mixing the fluids externally of said gun upon discharge therefrom, said gun comprising:
(a) a body having:
an elongated first bore formed therein;
a first set of spaced-apart inlet and outlet openings in fluid flow communication with said body bore for receiving and discharging the first fluid;
a second set of spaced-apart inlet and outlet openings in fluid flow communication with said body bore for receiving and discharging the second fluid, said second set of inlet and outlet openings being spaced apart along the length of said body bore from said first set of inlet and outlet openings; and,
a second bore extending through an adjacent portion of said body from the location of said first bore, said second bore being in fluid receiving communication with the outlet opening of said first set and including an outlet opening defining a fluid discharge path for the first fluid that intersects with the fluid flow path of the second fluid at a location externally of said gun;
(b) an elongated solid needle having portions snugly receivable and slidable within said body bore between a first, deactivated position and a second, activated position, said needle having:
a first section associated with said body first inlet and outlet openings, said needle first section including a first bore blocking portion and a reduced-diameter portion;
a second section associated with said body second inlet and outlet openings; said second section including a second bore blocking portion; and,
an intermediate section disposed between said first and second needle sections;
(c) means for slidably shifting said needle along said body bore between:
a first, deactivated position wherein said first bore blocking portion of said needle blocks fluid flow communication between said first inlet and outlet openings and said second bore blocking portion of said needle simultaneously blocks fluid flow communication between said second inlet and outlet openings of said body; and,
a second, actuated position wherein the reduced-diameter portion of said needle is disposed between said first inlet and outlet openings to permit fluid flow therebetween and said second bore blocking portion of said needle is positioned to permit fluid flow communication between said second inlet and outlet openings of said body;
(d) further comprising sleeve means closely receivable within said body bore, said sleeve means having:
portions defining a needle bore for snugly, slidably receiving said needle;
first inlet and outlet ports in communication with said needle bore and in registry with said body bore first inlet and outlet openings; and,
second inlet and outlet ports in communication with said needle bore and in registry with said second inlet and outlet openings;
(e) wherein said sleeve means include:
a first assembly associated with said first inlet and outlet ports;
a second assembly associated with said second inlet and outlet ports;
an intermediate section disposed between said first and second assemblies; and,
sealing means for sealing said first assembly of said sleeve means from said intermediate section of said sleeve means and for sealing said second assembly of said sleeve means from said intermediate section of said sleeve means; and,
(f) wherein the intermediate section of said sleeve means includes:
interior portions defining a clearance cavity around the intermediate section of said needle; and,
portions defining a cleaning medium inlet port in communication with said clearance cavity and a cleaning medium outlet port in communication with said clearance cavity.

14. An improved needle valve disposed within the barrel of a spray gun for simultaneously controlling the flow of first and second chemically reactive fluids through the gun and discharging the first and second fluids in converging streams to cause mixture of the first and second fluids as they flow together through the air, said improvement comprising:
(a) a first set of inlet and outlet passageways disposed within the barrel of the gun for receiving and discharging the first fluid;
(b) a set of second inlet and outlet passageways formed within and spaced apart along the length of the barrel of the gun from said first set of inlet and outlet passageways for receiving and discharging the second fluid;
(c) an elongate first bore extending through the barrel of the gun;
(d) a first sleeve assembly associated with said first set of said inlet and outlet passageways and disposed within said first barrel bore, said first sleeve assembly including a first central needle bore, a first inlet port in communication with said first needle bore and in registry with said first inlet passageway, and a first outlet port in communication with said first needle bore and in registry with said first outlet passageway;
(e) a second sleeve assembly associated with said second set of inlet and outlet passageways and disposed within said first barrel bore at a location spaced apart from said first sleeve assembly, said second sleeve assembly including a second central needle bore, a second inlet port in communication with said second needle bore and in registry with said second inlet passageway, and a second outlet port in communication with said second needle bore and in registry with said second outlet passageway;

(f) wherein said first barrel bore extending from said first set of passageways to said second set of passageways and being of smooth, uniform diameter along substantially its entire length for snug, slidable reception of said first and second sleeve assemblies;

(g) a second bore spaced from and extending through an adjacent portion of the gun barrel from the location of said first bore, said second bore being in fluid receiving communication with the outlet passageway of said first set and including an outlet opening defining a fluid discharge path for the first fluid that converges with the fluid flow path of the second fluid at a location externally of said gun;

(h) a unitary, elongate, solid needle extending through said first and second central needle bores defined by said first and second sleeve assemblies, said needle having:

a first section associated with said first sleeve assembly, said first needle section including a first inlet port blocking portion and a reduced-diameter portion; and, a second section associated with said second sleeve assembly, said needle second section including a second outlet port blocking portion;

(i) means for slidably shifting said needle longitudinally along said spray gun barrel relative to said first and second sleeve sections between:

a first, deactivated position wherein the blocking portion of the needle first section is positioned within said first sleeve section to block fluid flow communication between said first inlet and outlet ports, and said blocking portion of said needle second section is positioned within said second sleeve assembly to block fluid flow communication between said second inlet and outlet ports; and, a second, actuated position wherein the reduced diameter portion of said needle first section is disposed relative to said first inlet and outlet ports to permit fluid flow therebetween and said bore blocking portion of said second section of said needle is positioned relative to said second inlet and outlet ports to permit fluid flow communication therebetween;

(j) wherein one of said end sleeve and the second section of said needle defining a frustoconically-shaped face, and the other of said second section of said needle and said end sleeve defining a circular, sharp-edged opening for seating against said frustoconically-shaped face; and, (k) wherein said needle includes a reduced, constant diameter tip portion that snugly engages within said second outlet port when said needle is an deactivated position to prevent discharge of the second fluid and that is disengaged from said second outlet port when said needle is in actuated position to permit discharge of the second fluid.

15. The improvement according to claim 14, wherein said first sleeve assembly includes:

an inlet sleeve having said first inlet port extending transversely therethrough;

a first outlet sleeve having said first outlet port extending transversely therethrough; and seal means disposed between said first inlet and outlet sleeves of said first sleeve assembly to snugly engage over said needle when said needle is disposed in deactivated position to block transfer of the first fluid between said first inlet and outlet sleeves.

16. The improvement according to claim 14, further comprising sealing means disposed within said constant diameter first bore between said first and second sleeve assemblies and engaged over the needle to prevent the first and second chemically reactive fluid from mixing together.

17. The improvement according to claim 14, further comprising:

an intermediate sleeve section disposed between said first and second sleeve assemblies;

said needle including an intermediate section disposed between said first and second needle sections and associated with said intermediate sleeve section;

first sealing means engaged over said needle and disposed between said first sleeve assembly and said intermediate sleeve section; and second sealing means engaged over said needle and disposed between said second sleeve assembly and said intermediate sleeve section.

18. An improved needle valve disposed within the barrel of a spray gun for simultaneously controlling the flow of first and second dissimilar fluids through the gun and discharging the first and second fluids in converging streams to cause mixture of the first and second fluids as they flow together through the air, said improvement comprising:

(a) a first set of inlet and outlet passageways disposed within the barrel of the gun for receiving and discharging the first fluid;

(b) a set of second inlet and outlet passageways formed within and spaced apart along the length of the barrel of the gun from said first set of inlet and outlet passageways for receiving and discharging the second fluid;

(c) an elongate first bore extending through the barrel of the gun;

(d) a first sleeve assembly associated with said first set of said inlet and outlet passageways and disposed within said first barrel bore, said first sleeve assembly including a central needle bore, a first inlet port in communication with said needle bore and in registry with said first inlet passageway, and a first outlet port in communication with said needle bore and in registry with said first outlet passageway;

(e) a second sleeve assembly associated with said second set of inlet and outlet passageways and disposed within said first barrel bore at a location spaced apart from said first sleeve assembly, said second sleeve assembly including a central needle bore, a second inlet port in communication with said needle bore and in registry with said second inlet passageway, and a second outlet port in communication with said needle bore and in registry with said second outlet passageway;

(f) a second bore spaced from and extending through an adjacent portion of said body from the location of said first bore, said second bore being in fluid receiving communication with the outlet passageway of said first set and including an outlet opening defining a fluid discharge path for the first fluid that converges with the fluid flow path of the second fluid at a location externally of said gun;

(g) a unitary, elongate, solid needle extending through said central needle bore defined by said first and second sleeve assemblies, said needle having:

a first section associated with said first sleeve assembly, said first needle section including a first inlet port blocking portion and a reduced-diameter portion; and, a second section associated with said second sleeve assembly, said needle second section including a second outlet port blocking portion;

(h) means for slidably shifting said needle longitudinally along said spray gun barrel relative to said first and second sleeve sections between:

a first, deactivated position wherein the blocking portion of the needle first section is positioned within said first sleeve section to block fluid flow communication between said first inlet and outlet ports, and said blocking portion of said needle second section is positioned within said second sleeve assembly to block fluid flow communication between said second inlet and outlet ports; and, a second, actuated position wherein the reduced diameter portion of said needle first section is disposed relative to said first inlet and outlet ports to permit fluid flow therebetween, and said bore blocking portion of said second section of said needle is positioned relative to said second inlet and outlet ports to permit fluid flow communication therebetween;

(i) an intermediate sleeve section disposed between said first and second sleeve assemblies;

(j) wherein said needle including an intermediate section disposed between said first and second needle sections and associated with said intermediate sleeve section;

(k) first sealing means engaged over said needle and disposed between said first sleeve assembly and said intermediate sleeve section;

(l) second sealing means engaged over said needle and disposed between said second sleeve assembly and said intermediate sleeve section;

(m) intermediate inlet and outlet passageways within the barrel of the gun for receiving and discharging flushing medium; and, (n) wherein said intermediate sleeve section including:

interior portions defining a clearance cavity around the intermediate section of said needle; and, portions defining a cleaning medium inlet port in communication with said clearance cavity and in registry with said cleaning medium inlet passageway, and a cleaning medium outlet port in communication with said clearance cavity and in registry with said cleaning medium outlet passageway.

* * * * *

UNITED STATES PATENT AND TRADEMARK OFFICE
CERTIFICATE OF CORRECTION

PATENT NO. : 4,529,126
DATED : July 16, 1985
INVENTOR(S) : Frank Ives

It is certified that error appears in the above-identified patent and that said Letters Patent is hereby corrected as shown below:

| | | |
|---|---|---|
| Column 4, | line 68, | "sectioon" should be --section-- |
| Column 6, | line 51, | insert --and-- before "extends" |
| Column 9, | line 37, | "two" should be --to-- |
| Column 12, | line 8, | "opening" should be --port-- |
| | line 10, | "opening" should be --port-- |
| Column 13, | line 56, | ";" should be --,-- |
| Column 15, | line 55, | "an" should be --in-- |

Signed and Sealed this

Twenty-ninth Day of October 1985

[SEAL]

Attest:

DONALD J. QUIGG

*Attesting Officer*

Commissioner of Patents and Trademarks—Designate